United States Patent Office 3,184,787
Patented May 25, 1965

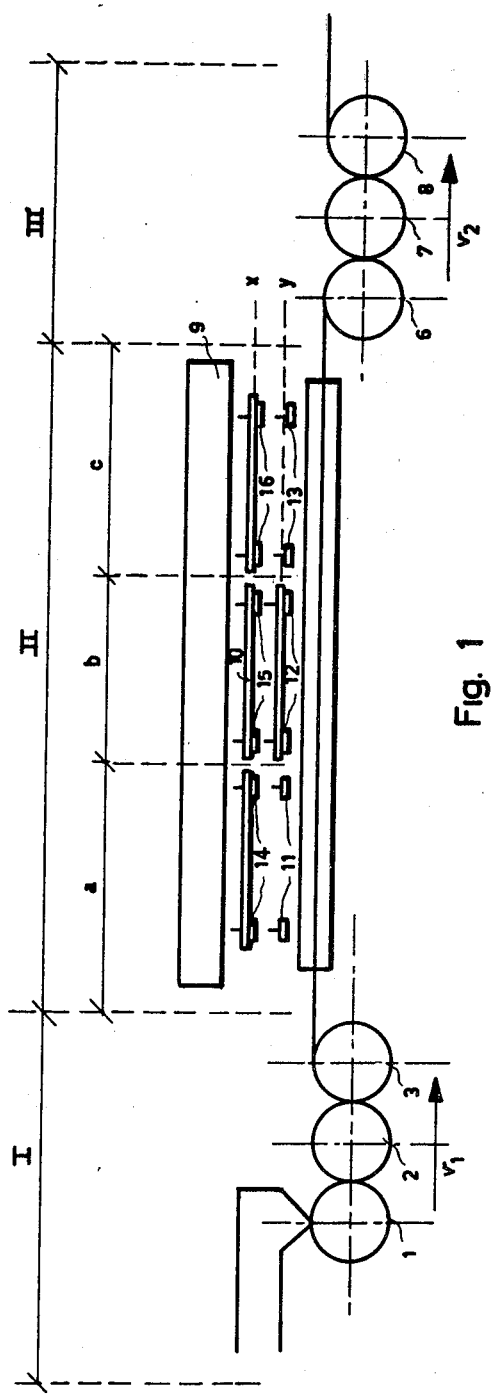

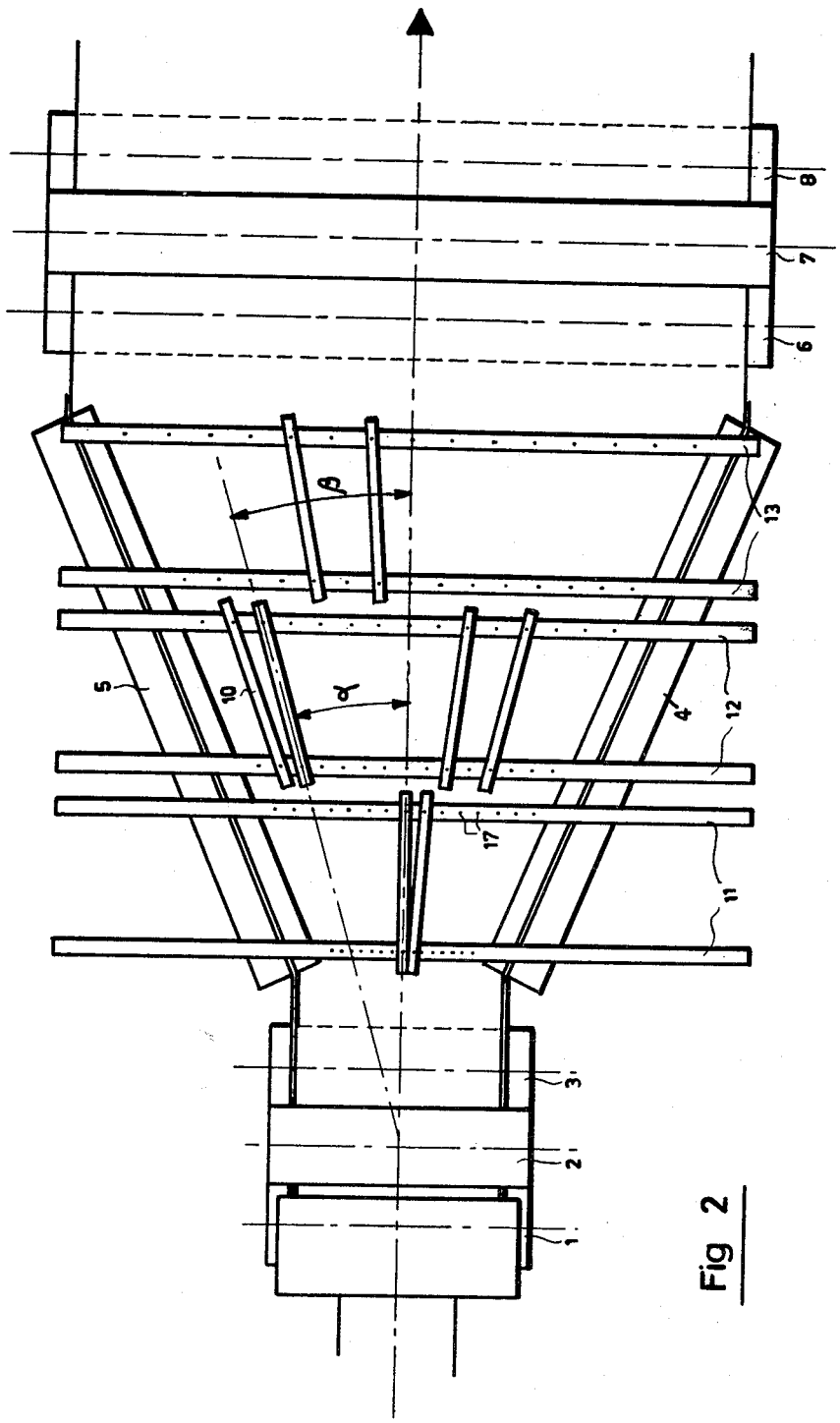

3,184,787
DEVICE FOR STRETCHING THERMOPLASTIC FILMS
Paul Jozef Steegmans, Edegem, Belgium, assignor to Gevaert Photo-Producten N.V., Mortsel, Belgium, a Belgian company
Filed July 27, 1962, Ser. No. 212,985
Claims priority, application Belgium, July 28, 1961,
40,848, Patent 606,650
8 Claims. (Cl. 18—1)

The present invention relates to a device for stretching thermoplastic films. More particularly this invention relates to a system in such an apparatus to give a uniform thickness to the stretched sheet.

It is known to improve the properties of films prepared from thermoplastic material by stretching them longitudinally or by stretching them simultaneously or subsequently in longitudinal and transverse direction.

During the stretching operation of the film, it is desired to keep it at the optimum temperature in order to obtain a most favorable orientation of the macromolecules. For this purpose a heating source is positioned in the stretching zone immediately above or under the film.

In practice, however, it is quite difficult to attain a uniform thickness all over the full width of the stretched film. The differences in thickness of the stretched film are caused by the local differences in temperature of the stretched film, these differences being themselves caused by an irregular heating of the film. This unequal heating is among others due to the unequalities of the heating source itself, to the difference in loss of heat between the edges and the middle part of the film. The greater loss of heat at the edges is caused by the lower temperature at the ouside (in the proximity of the wall of the apparatus), by the presence of grippers which seize and stretch the film, by the air turbulences caused by the movements of the grippers, by the guide members in case of stretching a film with beaded edges, etc.

A known apparatus allowing to eliminate the differences in temperature of the film sheet is described in the U.S. patent specification 2,718,658. The apparatus according to this U.S. patent specification comprises a set of parallel reflecting plates, which are pivotably mounted in vertical direction and positioned close to the film sheet which is stretched vertically. By an individual adjustment, i.e., by turning each reflecting plate about its vertical axis, the heat radiated by the film sheet can be more or less reflected whereby it is possible to control the local temperature of the film in transverse direction.

This device shows, however, the disadvantage that during the adjustment not only the area of the film situated close to the reflecting plate is submitted to a modification in temperature, but also other areas of the film are indirectly influenced by the modified reflection, this modification depending on the angle over which the reflecting plate has been turned. Moreover, the temperature near the edges is not easy to regulate, since the outer reflecting plates influence different areas of the film, owing to their parallel position to each other.

Now an apparatus has been found for stretching thermoplastic film whereby the heat distribution in the film is controlled by narrow reflecting elements mounted in the stretching zone parallel to the film, characterized in that these elements are mounted between the heating source and the film and that the angle formed by the projection of the longitudinal axis of each element on the film and by the longitudinal axis of the film is equal to the stretching angle of the film part which coincides with the projection of that element.

In this way the temperature at each place in transverse direction of the stretched film can be influenced, whereby an accurate control of the thickness is possible.

According to a particular embodiment of the present invention, the reflecting elements are groupwise mounted behind or above each other in the stretching zone. As the control effect is different for each group, the possibilities for adjusting the device of the present invention are still extended in this way.

Referring to the accompanying drawings the invention is now described by way of example.

FIG. 1 is a diagrammatic side view of the device according to the example.

FIG. 2 is a diagrammatic top view of the device according to the example, wherein the I.R.-radiation unit is omitted.

In FIG. 1 a device is represented for extruding a film with beaded edges and subsequently for simultaneously biaxially stretching the film by guiding the beaded film edges along diverging guide members. Such a device is described in our U.S. patent application Serial No. 49,991, filed August 16, 1960, issued as U.S. Patent No. 3,124,834, granted March 17, 1964.

The polymer for manufacturing the film is extruded by means of a commercially available extruder at a temperature higher than the softening points zone I in FIGS. 1 and 2).

The extruded film is received on the rollers 1, 2 and 3 in zone I and is cooled on these rollers to the softening point. The film is maintained at this temperature by heating the rollers to the softening point. These rollers are rotating with a peripheral speed $v_1$ which is equal to or higher than the extrusion speed.

Next, the film is conveyed into zone II of the stretching apparatus where the film edges are obliged to move behind the guide members of the frames 4 and 5, which effect a transverse action on the film edges, owing to their diverging position (FIG. 2). The desired stretch of the film in transverse direction is defined by the angle between the two guide members.

After completion of the stretching process, the beaded edges are separated from the film, whereupon the film is conveyed in zone III to the pull rollers 6, 7 and 8, rotating at a peripheral speed $v_2$ which is higher than $v_1$. The speed difference between the feed rollers 1, 2 and 3 (speed $v_1$) and the pull rollers 6, 7 and 8 (speed $v_2$) causes simultantously with the traneverse stretching by the guide members, a longitudinal stretching, so that in the zone II the desired biaxial stretching of the film is obtained.

To keep the film at its optimum temperature during the stretching operation, an infrared radiation unit is positioned at a short distance of the film in the stretching zone. This I.R. radiation unit may consist, as known, of a copper plate which is heated by electric I.R. radiating elements, resistors, induction, hot oil, etc.

According to the invention a number of reflecting plates are positioned in the zone II between the I.R. radiation unit 9 and the film. These reflecting plates reflect an amount of the I.R. radiation so that the temperature of the film to be stretched, passing under the reflecting plates, is lower than the adjacent parts of the film.

Each reflecting element is mounted according to an angle $\alpha$ which corresponds to the stretching angle $\beta$ formed by the center line of the film and by the diverging course of the film part passing under the respective reflecting element. The elongate reflecting elements are mounted substantially longitudinally to the direction of movement of the film in a predetermined angular position relative to the axis of the film path, the longitudinal direction of the reflecting elements corresponding to the direction in which the film portion located immediately under the reflecting element moves during the stretching operation.

The reflecting elements are positioned in three groups $a$, $b$ and $c$, each time in a plane $x$ or $y$.

Six pairs of transverse bars 11, 12, 13, 14, 15 and 16 are provided for the disposition of the reflecting elements. Each of these transverse bars has an equal number of pins 17, the mutual distance between these pins being determined by the position of the respective transverse bars in the stretching zone II. Each pair of transverse bars 11 constitutes a frame which is laterally movable. In this way the reflecting elements can easily be mounted and removed.

The reflecting elements are applied as follows: After the device is operating long enough for allowing the temperature to stabilize in each area of the film, one proceeds to the measuring of the thickness of the film in transverse direction, this measuring being executed behind the roller 8. Judging from the importance of the differences observed together with the place of their occurrence, one can estimate the number of the required reflecting elements as well as their place of positioning. It is quite clear that the reflecting elements in plane $x$ have a smaller influence on the heat distribution in the film material than those in plane $y$; moreover the influence of the reflecting elements in plane $y$ is more localized than for the elements in plane $x$. This latter feature is also different for each of the groups $a$, $b$ and $c$. Indeed, it is evident that the reflecting elements of group $c$ will influence the heat distribution of the film in a smaller degree than the reflecting elements of groups $a$ and $b$, which also applies to the influence of the reflecting elements of the group $b$ with regard to the elements of group $a$.

After having achieved a predetermined disposition of the reflecting elements, one has to wait long enough to allow the stabilization of the temperature before executing the next measurement.

The following example illustrates the present invention.

*Example*

A polystyrene with softening point at 95° C. is softened and homogenized in a commonly available 60 mm. extruder the cylinder temperature of which is accurately maintained at 220° C. by an electronic control system. The thus softened polystyrene is extruded through the slot die having a rectangularly shaped profile of 350 mm. x 4.2 mm. and the edges of which showing a circularly shaped form having a diameter three times as large as that of the slot die.

The film is guided over the rollers 1, 2 and 3 which are heated at 94° C. to maintain the film at its softening point. The temperature in the housing built over the apparatus is 93° C. The film is then introduced into the stretching zone wherein the film edges are slid behind the guide members 4 and 5. By the traction of the pull rollers 6, 7 and 8 the film is stretched by 300% in both transverse and longitudinal directions. The stretched film has a speed of 2 m./min., a thickness of 0.25 mm. and a width of 1200 mm. The temperature of the film is maintained to a constant value by means of an I.R. radiation unit positioned above this film. The temperature of the film during the stretching process is determined by the temperature in the housing, the temperature of the I.R. radiation unit and the positioning of the reflecting elements.

The maximum deviations in the thickness of the thus obtained film amount to 0.01 mm., i.e., 4%.

It is evident that the invention is not limited to the present example. The reflecting elements according to the present invention can also favorably be applied in an apparatus wherein stretching is performed by means of grippers instead of beaded edges. In this respect we refer to the U.S. patent application Serial No. 53,569, filed November 9, 1960, and to the patent specifications 2,412,187 and 2,728,941. It is not necessary to execute the stretching of the film in both transverse and longitudinal directions simultaneously. This stretching in both directions may occur subsequently in two separate steps.

If it is necessary to rid the film sheet from internal tensions, a zone IV may be installed following zone III, where the film is slipped into grippers linked to two parallelly mounted chains; at the right temperature stabilization can take place without shrinking. Then the film is cooled, the edges are cut off and the film is wound up.

Finally, the reflecting elements can also be fitted in a single plane or in two or more planes. Furthermore, the number of groups of reflecting elements may vary, the width of the various elements as well as their reflecting power may differ, etc.

I claim:

1. Apparatus for controlling the heat exchange of thermoplastic film in the stretching of the film transversely of its direction of movement through a stretching zone, comprising in combination
    heating means disposed above the film and adapted to radiate heat toward the film,
    and elongate heat reflecting means mounted between the film and said heating means,
    said elongate means being disposed in said stretching zone in spaced relationship parallel to the plane of the film and extending substantially longitudinally of the direction of movement of the film,
    the longitudinal axis of said elongate elements diverging outwardly in the direction of movement of the film relative to the center line of the film.

2. Apparatus for controlling the heat exchange of thermoplastic film in the stretching of the film transversely of its direction of movement through the stretching zone, comprising in combination
    heating means disposed above the film and adapted to radiate heat toward the film,
    support means disposed over said stretching zone between said heating means and said film,
    elongate heat reflecting means mounted on said support means,
    said elongate means being disposed in said stretching zone in spaced relationship parallel to the plane of the film and extending substantially longitudinally of the direction of movement of the film,
    the longitudinal axis of said elongate elements diverging outwardly in the direction of movement of the film relative to the center line of the film.

3. Apparatus for controlling the heat exchange of thermoplastic film in the stretching of the film transversely of its direction of movement through the stretching zone, comprising in combination
    heating means disposed above the film and adapted to radiate heat toward the film,
    support means disposed over said stretching zone between said heating means and said film,
    elongate heat reflecting means mounted on said support means,
    said elongate means being mounted on said support means substantially longitudinally to the direction of movement of the film in a predetermined angular position relative to the center line of the film, said longitudinal direction of said elongate element corresponding to the direction in which the film portion immediately under said elongate element moves during the stretching operation.

4. Apparatus according to claim 2 wherein said support means consist of at least one pair of parallel bars disposed substantially transversely in the same plane over the stretching zone.

5. Apparatus according to claim 4 wherein said elongate reflecting elements have a length which is less than the length of the stretching zone,
    said elongate reflecting elements being mounted on at least two of said pairs of bars disposed adjacent each other in the direction of movement of the film.

6. Apparatus according to claim 4 wherein said elongate elements are mounted on pins fixed to said bars and extend between two adjacent bars, the corresponding pins of the bar of a pair of said parallel bars located upstream of the direction of movement of the film being spaced closer to each other than the pins on the opposite bar of said pair of parallel bars.

7. Apparatus according to claim 4 wherein said elongate elements are mounted on a plurality of said parallel bars disposed in parallel planes above each other.

8. Apparatus according to claim 1 wherein said elongate reflecting elements are flat rectangular strips.

References Cited by the Examiner
UNITED STATES PATENTS

| | | | |
|---|---|---|---|
| 2,560,855 | 7/51 | Flanagan | 18—1 |
| 2,782,458 | 2/57 | Emmert et al. | 18—1 |
| 2,788,841 | 4/57 | Hockett | 18—1 |
| 2,923,966 | 2/60 | Tooke et al. | 18—1 |
| 3,004,284 | 10/61 | Limbach | 18—1 |

WILLIAM J. STEPHENSON, *Primary Examiner.*